Dec. 2, 1969 N. SZEREMY 3,482,041
COMBINED KEYED AGC AND SYNC SEPARATOR CIRCUIT
Filed Dec. 15, 1966
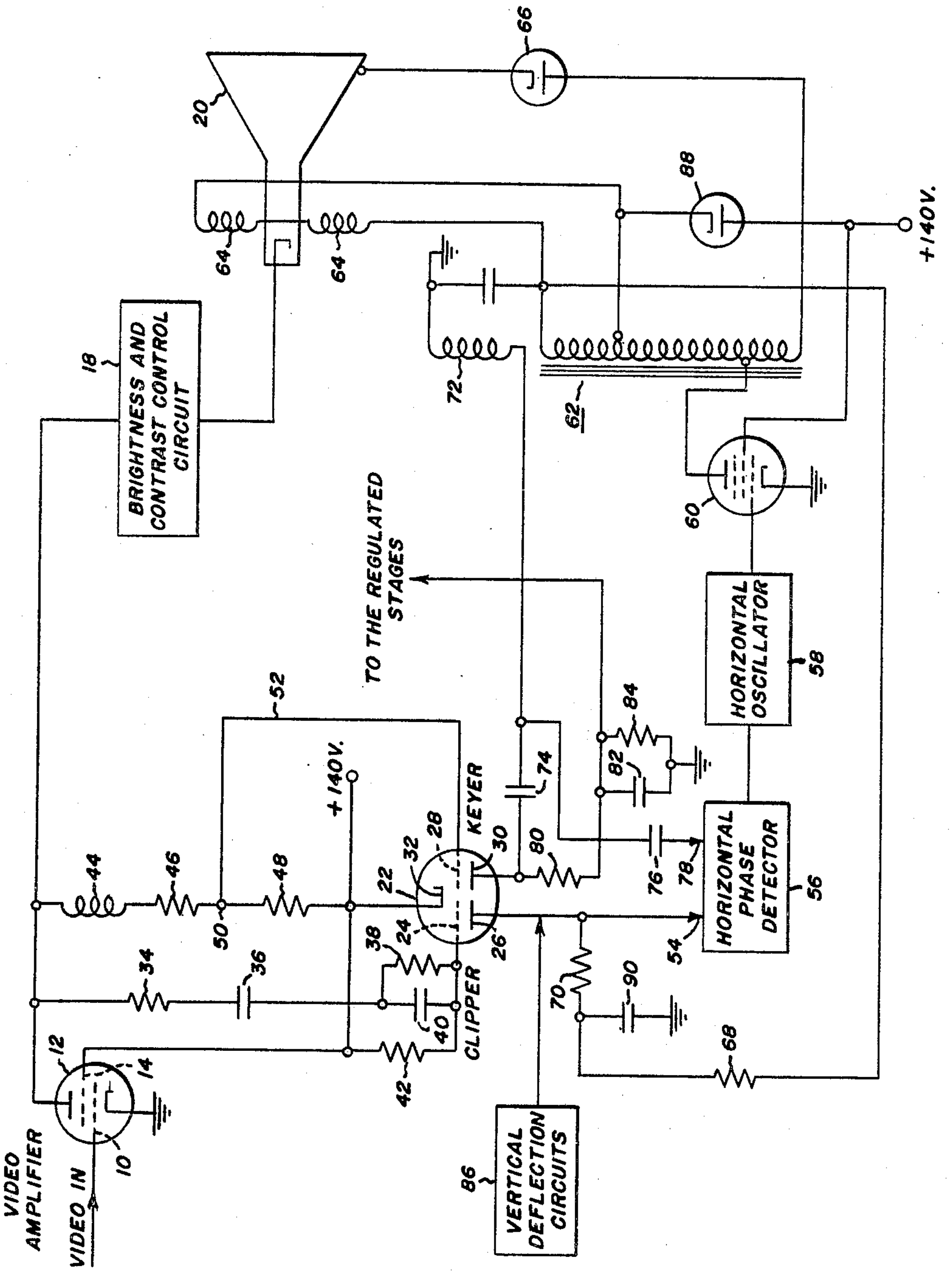
INVENTOR:
NORMAN SZEREMY,
BY Francis H. Boos, Jr.
HIS ATTORNEY.

3,482,041
Patented Dec. 2, 1969

3,482,041

COMBINED KEYED AGC AND SYNC SEPARATOR CIRCUIT

Norman Szeremy, Syracuse, N.Y., assignor to General Electric Company, a corporation of New York Filed Dec. 15, 1966, Ser. No. 601,978
Int. Cl. H04n 3/16, 5/44
U.S. Cl. 178—7.3 1 Claim The present invention relates to television receivers and more particularly to a simplified circuit for serving the dual functions of separation of synchronizing pulses from the composite video signal and of providing a keyed automatic gain control circuit.

In television receivers, two carrier frequencies are modulated, one with the video and synchronizing information, the other with the audio information. The modulated carriers are amplified in a radio frequency stage, are converted to an intermediate frequency and this is demodulated after several stages of additional amplification. The result of the demodulation is commonly referred to as the composite video signal. This signal is further amplified in the video amplifier section. The output of this section contains the picture information, the sound information and the synchronizing pulses. The first two of these are utilized in sections of the TV receiver that are not involved in this invention, these will not be outlined in further detail.

The synchronizing information contained in the amplified composite video signal is separated from this in the synchronizing pulse separator, or clipper stage, as this is frequently referred to, since it clips off the audio and video portions from the composite video signal, leaving only the synchronizing pulses at its output. The horizontal synchronizing pulses are fed from there to the horizontal sweep generating and frequency controlling portions of the receiver, while the vertical synchronizing pulses are channeled to the vertical sweep oscillator, where they trigger conduction in the vertical oscillator tube thereby causing its rate of oscillation to coincide with that of the vertical synchronizing pulses.

The frequency of the horizontal oscillator is generally controlled by a phase detector or phase comparator stage. It has two inputs; one is fed by the horizontal synchronizing pulses coming from the output of the sync separator, the other is by horizontal sweep pulses that are derived at one of many suitable points in the horizontal sweep generating system. As long as the pulses at the two inputs are in a desired phase relation to each other, the output of the phase detector is zero and this stage has no further influence on the frequency of the horizontal oscillator. When, however, this desired phase relationship ceases to exist for any reason, the phase detector will generate a correction voltage, and this, fed to the horizontal oscillator stage, causes the frequency of this to change, until the desired phase relationship is re-established.

The output of the horizontal oscillator, after suitable wave shaping is further amplified in the horizontal output stage, which feeds a horizontal output transformer. Across part of this transformer are connected the horizontal deflection coils. In these the amplified horizontal sweep pulse causes a sawtooth-shaped current to flow and the resulting magnetic field deflects the electron beam across the face of the picture tube horizontally.

In many television receivers the pulse for the second input of the horizontal phase detector is derived from a so-called reference winding of the horizontal output transformer, which is inductively coupled to the primary of the transformer. The pulse across this winding is in step with the horizontal deflection pulse and it can be, therefore, used for phase comparison with the horizontal synchronizing pulse. The reference pulse is also of the correct phase, polarity and magnitude to serve as keying pulse for a separate keyed automatic gain control triode, the output of which is used to regulate the gain of the radio frequency and intermediate frequency amplifiers.

In the past, the triode used in the pulse separator and the triode employed in the keyed automatic gain control stage were two separate and independent tubes because the cathodes of the two tubes had to be maintained at different potential levels. The cathode of the keyer triode was, on many receivers, connected to the conventional DC power source, whereas the cathode of the clipper triode was kept at ground potential. Since two complete tube structures had to be used, the arrangement was relatively costly and it required the number of pin connections that are found in two separate tubes. This latter consideration is of importance, where several tube functions are to be incorporated in one common glass envelope and the number of available pin connections is limited.

To overcome these and other deficiencies of the prior art circuits, the present invention comprehends the use of a simplified combination circuit to serve the dual functions of separating the synchronizing pulses from the composite video signal and of providing a keyed automatic gain control voltage. The combination circuit includes two triodes driven from a single, common cathode and having first and second control grids as well as first and second plates. The common cathode is connected to the conventional DC power supply, and the first control grid is driven through a suitable combination high and low time constant coupling circuit by the output of the video amplifier tube. The first plate of this tube is connected through a plate load resistor and a resistive capacitive filter section to the boost voltage of the receiver, which is generated in the horizontal output section and is of a considerably higher voltage than that which exists at the common cathode. This first section is biased through a conventional grid leak arrangement so that conduction in the tube is allowed only during the synchronizing pulses, and therefore the output of the tube will contain only these pulses, without the rest of the information present at the first grid.

To the second control grid of the combination tube is fed a divided down portion of the amplified composite video signal from the output of the video amplifier tube. The second plate in the tube is capacitively coupled to the reference winding and is also connected to a plate load resistor and its output is fed into the filter circuit of the automatic gain control system. Operating voltages are established so that conduction in the tube is allowed only during coincidence of the synchronizing pulses on the grid and the keying pulses on the plate. When conduction exits, its magnitude, and consequently the output voltage of the tube, is directly proportional to the magnitude of the synchronizing pulse, which in turn is proportional to the strength of the received TV signal. The negative output voltage of the keyer tube is therefore proportional to the strength of the received TV signal and can be used after suitable filtering to regulate the gain of the controlled radio frequency amplifier and intermediate frequency amplifier stages.

While the specification concludes with claim particularly pointing out and distinctly claiming that which is regarded as the present invention, the details of the invention along with its further objects and advantages may be more readily ascertained from the following description when read in conjunction with the accompanying drawing in which:

FIGURE 1 is a circuit diagram for portions of a television receiver including one embodiment of the present invention.

In the circuit shown in FIGURE 1, a composite video signal is applied to a signal grid 10 of a video amplifier tube 12. The amplified output of this tube appears across a plate load impedance which consists of the series combination of resistors 46 and 48 and frequency response correcting inductance 44. This output is delivered to the brightness and contrast control circuits 18 in the cathode circuit of picture tube 20. The amplified composite video signal, split into two further channels is also applied to the respective input electrodes of a combination tube, which serves the dual functions of separating synchronizing pulses from the composite video signal and of delivering control voltage for the regulated amplifying stages of the receiver. The single tube 22 in the combined circuit consists of a first control grid 24, associated with the sync separator section of the tube, a first plate 26, also associated with the separator section, a second control grid 28, associated with the keyed gain control section, a second plate 30, also associated with the keyer section and a single cathode 32 which is common to both functions.

The amplified composite video signal is applied to the first control grid 24 through a double time constant circuit consisting of the series combination of resistor 34 and capacitor 36 in further series connection with a parallel combination of resistor 38 and capacitor 40. This arrangement is quite conventional; it serves to improve the impulse noise immunity of the receiver. Biasing for the control grid 24 is provided by a conventional grid leak resistor 42 connected between the control grid 24 and cathode 32. This cathode 32, the common reference point for both sections of the single combination tube 22 is connected to the same DC voltage which serves as supply voltage for both screen grid 14 and plate of video amplifier tube 12. The second control grid 28 of tube 22 receives its input voltage from the junction 50 of the serially connected video amplifier plate load resistors 46 and 48, through conductor 52.

Grid current, which flows in the sync separator section of tube 22 and through resistor 42 when the positive going sync pulses contained in the composite video signal reach grid 24, will cause grid 24 to have a negative potential in relation to the cathode 32. This potential biases the tube beyond cutoff for the remainder of the composite video signal so that the tube conducts and amplifies only for the duration of the sync pulse. The separated and amplified sync pulses are split into two channels, the first of these goes to the vertical sweep signal generating section 86 and is utilized there for vertical synchronization in the conventional manner. The second channel conducts the horizontal synchronization pulses to a first input 54 of a horizontal phase detector 56, the output voltage of which controls the frequency of horizontal oscillator 58. The sweep signals generated in the horizontal oscillator 58 are applied to the control grid of a horizontal output tube 60 which is operated so that during a small portion of the sweep signal the plate current in the tube is cut off. As the plate current rises from cutoff to a relatively high value due to the positively going sweep signal applied to the control grid of horizontal output tube 60, it causes a corresponding changing voltage in a horizontal output transformer 62 which is connected as the plate load for horizontal output tube 60. Horizontal output transformer 62 is an autotransformer, in which the amplified sweep voltage is stepped down to drive the horizontal deflection coils 64 which are electrically connected across a part of it and which are physically located on the neck of picture tube 20.

Plate current cutoff in horizontal output tube 60 occurs in an extremely short time, causing a very rapid collapse of the magnetic field which the plate current generated in horizontal output transformer 62 just before cutoff was initiated. The collapse of the magnetic field induces a high level pulse in the horizontal output transformer 62, which is further stepped up and conducted through high voltage rectifier 66 to the accelerating anode of picture tube 20. To prevent oscillation of the induced high level pulse, a damping diode 88 is connected between that tap on horizontal output transformer 62 which feeds deflection windings 64 and the DC power source. The damping diode rectifies ringing or oscillations into what is commonly called "boost voltage" which is used as plate voltage supply for horizontal output tube 60, and filtered through resistor 68 and capacitor 90, also for the sync separator section of combination tube 22.

Horizontal output transformer 62 is equipped with a reference winding 72 which is coupled inductively to it. In this winding 72 the collapse of the magnetic field also induces a pulse voltage of short duration. This pulse is applied through coupling capacitor 76 to the horizontal phase detector 56 as a reference signal and through blocking capacitor 74 to the second plate 30 of the keyer section of tube 22 as a keyer pulse.

The horizontal phase detector compares the phases of the signals at its first and second inputs and produces a correction voltage whcih controls the frequency of horizontal oscillator 58 so that a predetermined phase relationship exists between its output pulse and the horizontal sync pulse fed to the first input 54 of phase detector 56. The keyer pulse, which is applied to the second plate 30 of the keyer section of tube 22, causes this section to conduct whenever there is coincidence between the keyer pulse and the sync pulse which is applied to the second control grid 28 of the tube. The resulting plate current is proportional to the magnitude of the sync pulse, which in turn is a measure of the strength of the received signal. The plate current flows after filtering by resistor 80 and capacitor 82, through resistor 84 and causes a voltage drop over it so that that end of resistor 84 which is not connected to chassis ground, becomes more negative as the strength of the received signal increases. This negative voltage is fed as AGC voltage to the regulated stages to control their amplification.

From the foregoing it will be seen that the tube 22 with a common cathode for both tube sections, has effectively replaced a pair of triodes as were used in the prior art circuits. This replacement is made possible by connecting the single common cathode to the conventional DC power source and by feeding the plate of the pulse separator section of tube 22 from the boost voltage so that the normal plate to cathode voltage differential is maintained for that section. Since the cathode of the keyer triode is maintained at the potential of the DC power source in many known prior art circuits, there is no problem in maintaining the required plate to cathode voltage differential for the keyer section of the tube 22.

While there has been described what is regarded as a preferred embodiment of the invention, variations and modifications may occur to those skilled in the art. Therefore, it is intended that the appended claims shall cover all such variations and modifications as fall within the true spirit and scope of the invention.

What is claimed as new and desired to be secured by Letters Patent of the United States is:

1. In a television receiver having a DC power source, a video amplifier, AGC regulated amplifying stages, a vertical sweep circuit, and a horizontal sweep circuit in which keying pulses and a boost voltage exceeding that of the DC power source can be developed, the improvement comprising a combined circuit serving the dual functions of separating synchronizing pulses from the composite video signal and of delivering automatic gain control voltage to the regulated amplifying stages, said combined circuit including:

(a) a single tube having a first control grid, a second control grid, a first plate, a second plate and a single cathode;

(b) a first conductor for electrically connecting said single cathode to the DC power source;

(c) an inductive impedance circuit connected between the output of said video amplifier and the DC power source;

(d) an RC time constant circuit connected between the output of the video amplifier and said first control grid;

(e) a second conductor electrically connecting said first plate to the horizontal and vertical sweep circuits to allow the delivery of synchronizing pulses thereto;

(f) an impedance circuit for electrically connecting said first plate to the source of booster voltage;

(g) a third conductor for electrically connecting said second control grid to said inductive impedance circuit;

(h) capacitive means for electrically connecting said second plate to the means for developing keying pulses;

(i) an impedance circuit for connecting said second plate to said regulated amplifying stages to allow the delivery of a control voltage thereto.

References Cited

UNITED STATES PATENTS 3,247,318 4/1966 Bohlke ............ 178—7.3

ROBERT L. GRIFFIN, Primary Examiner

R. L. RICHARDSON, Assistant Examiner